(12) United States Patent
Eppich et al.

(10) Patent No.: US 6,769,897 B2
(45) Date of Patent: Aug. 3, 2004

(54) DEVICE FOR MONITORING FORCE AND PRESSURE IN INJECTION MOLDING MACHINES

(75) Inventors: Stefan Eppich, Arbing (AT); Alfred Ellinger, Tragwein (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 218 days.

(21) Appl. No.: 10/179,692

(22) Filed: Jun. 25, 2002

(65) Prior Publication Data
US 2003/0008028 A1 Jan. 9, 2003

(30) Foreign Application Priority Data

Jul. 9, 2001 (AT) ................................. GM 541/2001 U

(51) Int. Cl.[7] .............................................. B29C 45/77
(52) U.S. Cl. .................. 425/151; 73/862.382; 425/149; 425/170
(58) Field of Search ................................ 425/136, 137, 425/145, 149, 151, 170; 73/862.382

(56) References Cited

U.S. PATENT DOCUMENTS 3,365,689 A * 1/1968 Kutsay ................... 73/862.632
3,646,809 A * 3/1972 Pugnaire ................ 73/862.382
4,283,941 A    8/1981 Kutsay
4,961,696 A * 10/1990 Yamamura .................. 425/170
5,209,936 A *  5/1993 Ihara et al. ................. 425/170
6,461,139 B1 * 10/2002 Yokoya et al. ............. 425/170

FOREIGN PATENT DOCUMENTS

| DE | 19950534 | 4/2000 |
| EP | 0870589 | 10/1998 |
| EP | 1151843 | 11/2002 |
| FR | 2571854 | 10/1984 |
| JP | 03-038318 | 2/1991 |
| JP | 8-281733 | 2/1997 |

OTHER PUBLICATIONS

European Search Report.
Austrian Search Report.

* cited by examiner

Primary Examiner—James P. Mackey
(74) Attorney, Agent, or Firm—Notaro & Michalos PC

(57) ABSTRACT

Device for monitoring force and pressure in injection molding machines, with at least one sensor for measuring the deformation of a machine part that is deformed by the closing or injection pressure, wherein a supporting body (2) is provided that relieves the machine part (3) monitored by the sensor (1) as soon as the closing or injection pressure exceeds a certain value that is less than half its maximum value.

4 Claims, 5 Drawing Sheets

DEVICE FOR MONITORING FORCE AND PRESSURE IN INJECTION MOLDING MACHINES

The present invention relates to a device for monitoring force and pressure in injection moulding machines, with at least one sensor for measuring the deformation of a machine part that is deformed by the closing or injection pressure.

It is typical for injection moulding machines that both in the closing procedure and the injection procedure, forces of different magnitudes occur and have to be monitored.

The closing force with which the mould halves are held together while plastic material is filled into the hollow space in the mould, for example, is typically in the order of 1,000 kN. On the other hand, if an object accidentally remains between the opened mould halves, a force of a few N occurring when this object is compressed should be sufficient to actuate a mould protection device and to terminate the closing procedure.

On the injection side, two different procedures take place that can also be best controlled by monitoring the forces and pressures occurring. Firstly, the granulate material supplied to a screw is plasticised and conveyed into the space in front of the screw. The screw gradually moves backwards under the influence of the back pressure in the plastics material. This back pressure can be, for example, 40 bar. Once the desired amount of plastics is plasticised, the rotation of the screw is ended and it is used functioning as a piston to inject the plastics material. The pressure occurring then can easily be 2,000 bar.

Particularly in the case of toggle machines and electrically actuated machines, monitoring of force takes place in that the expansion, compression or bending of a machine part subjected to the forces is monitored, for example by means of expansion measuring strips. Such devices do not, however, function over the whole range of forces occurring. Thus, if forces are to be monitored in the mould protection range on the closing side and the back pressure range on the injection side, it must be ensured that the sensors suitable for this are not overloaded in the closing pressure or injection pressure range. According to the invention, a supporting body is provided for this, that relieves the machine part monitored by the sensor as soon as the closing or injection pressure exceeds a certain value that is less than half its maximum value.

For the force range in which the sensor is bypassed, a further sensor can be provided that monitors the closing and injection pressure up to its maximum value.

The constructive implementation of the concept of the invention will hereinafter be explained with reference to the drawings. In these there is shown, in FIG. 1 the side view of the closing side of an injection moulding machine, FIG. 2 the side view of a sensor for monitoring a machine part stressed by pressure, FIG. 3 the schematic diagram of monitoring of a joint stressed by bending, FIG. 4 the monitoring of a beam stressed by expansion, FIG. 5 the application of the invention to an injection unit shown in section.

Figure 1:
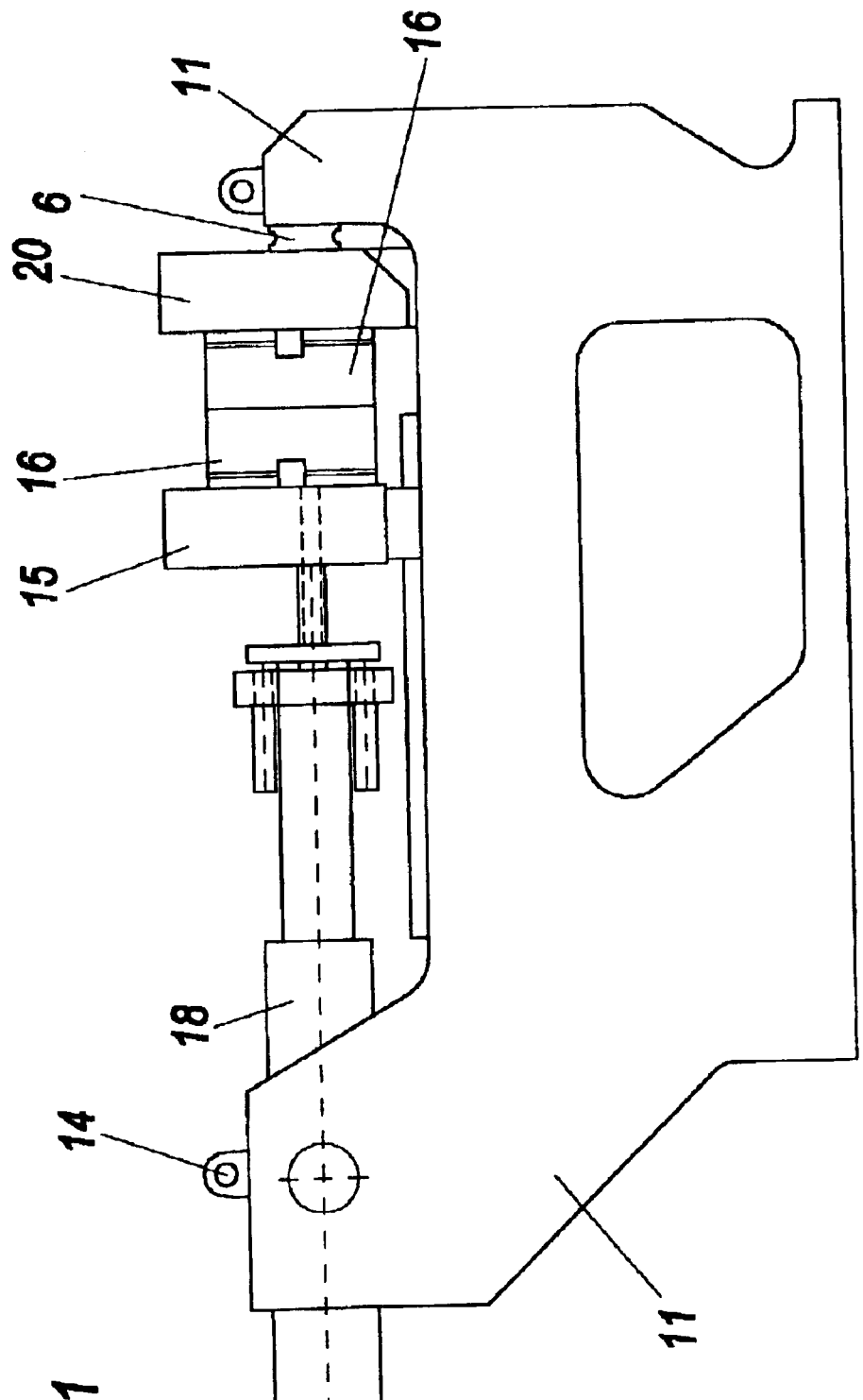
Figure 2:
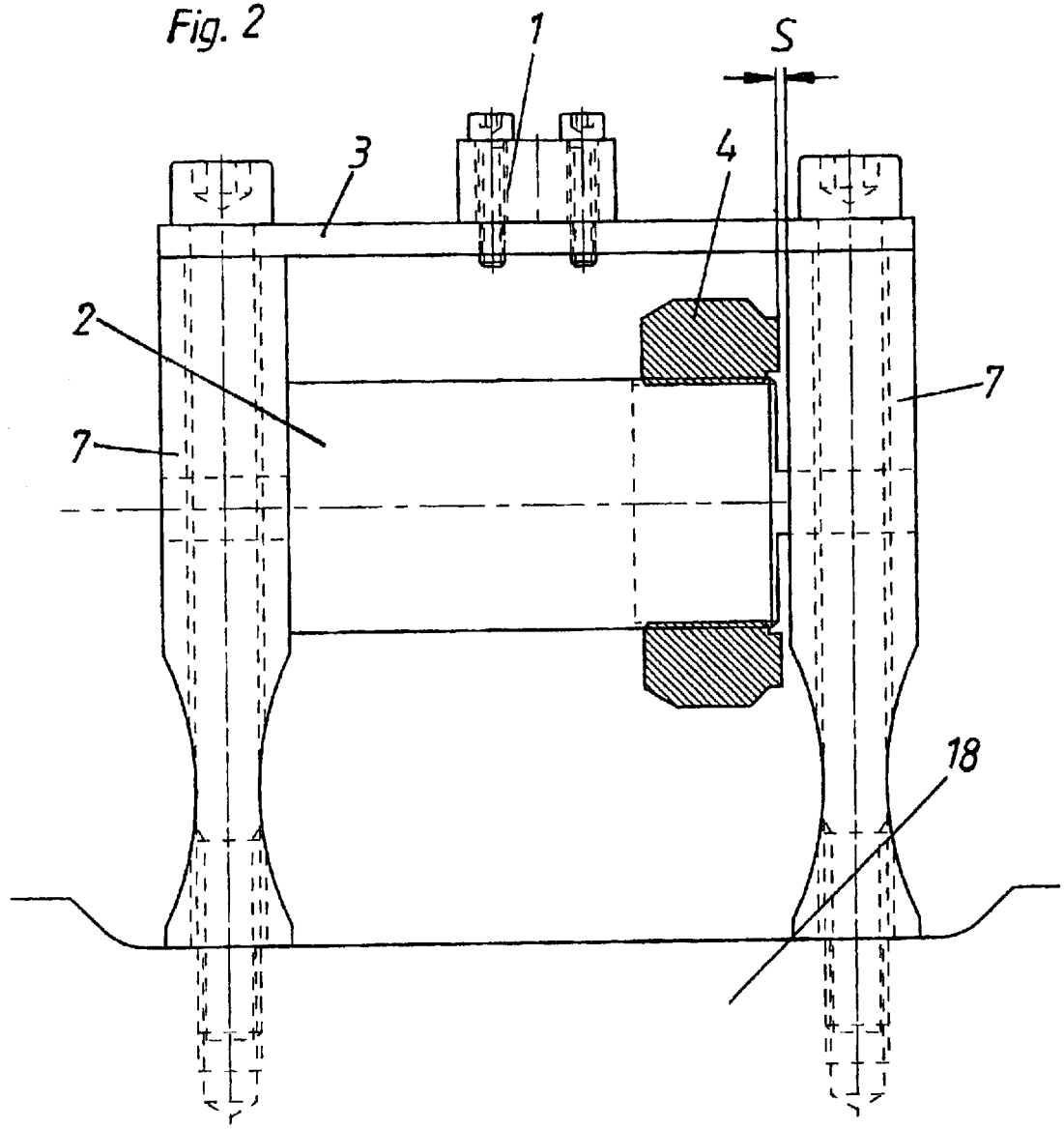

In FIG. 1 the closing side of an injection moulding device is shown, wherein a stationary mould clamping plate 20 and a movable mould clamping plate 15 are arranged on a beamless machine frame 11. Each mould clamping plate carries a mould half 16. The movable mould clamping plate 15 can be moved by a pivotably mounted hydraulic cylinder 18, whereby the mould formed by the two mould halves opens and closes. Under the influence of the closing force, deformations of the machine frame 11 that occur are balanced out on the one hand by pivoting the cylinder 18 about the axis 14, and on the other hand by deformation of the retaining parts 6, which form a flexible joint, arranged on the right and left of the stationary mould clamping plate 20.

Compression of the part 18 by force occurring in the closing procedure also has to be indicated when this force is generated only by an object hindering the closure of the mould halves 16, and is relatively small. The device according to FIG. 2 serves this purpose. On two uprights 7 that are connected by a part 18 a machine part 3 is arranged that is monitored by the sensor 1, which part initially cooperates with the deformation of the part 18. Once the clearance S has been overcome by one upright 7 coming to lie against the stop nut 4, the supporting body 2 prevents further shortening of the machine part 3 being monitored.

Figure 3:
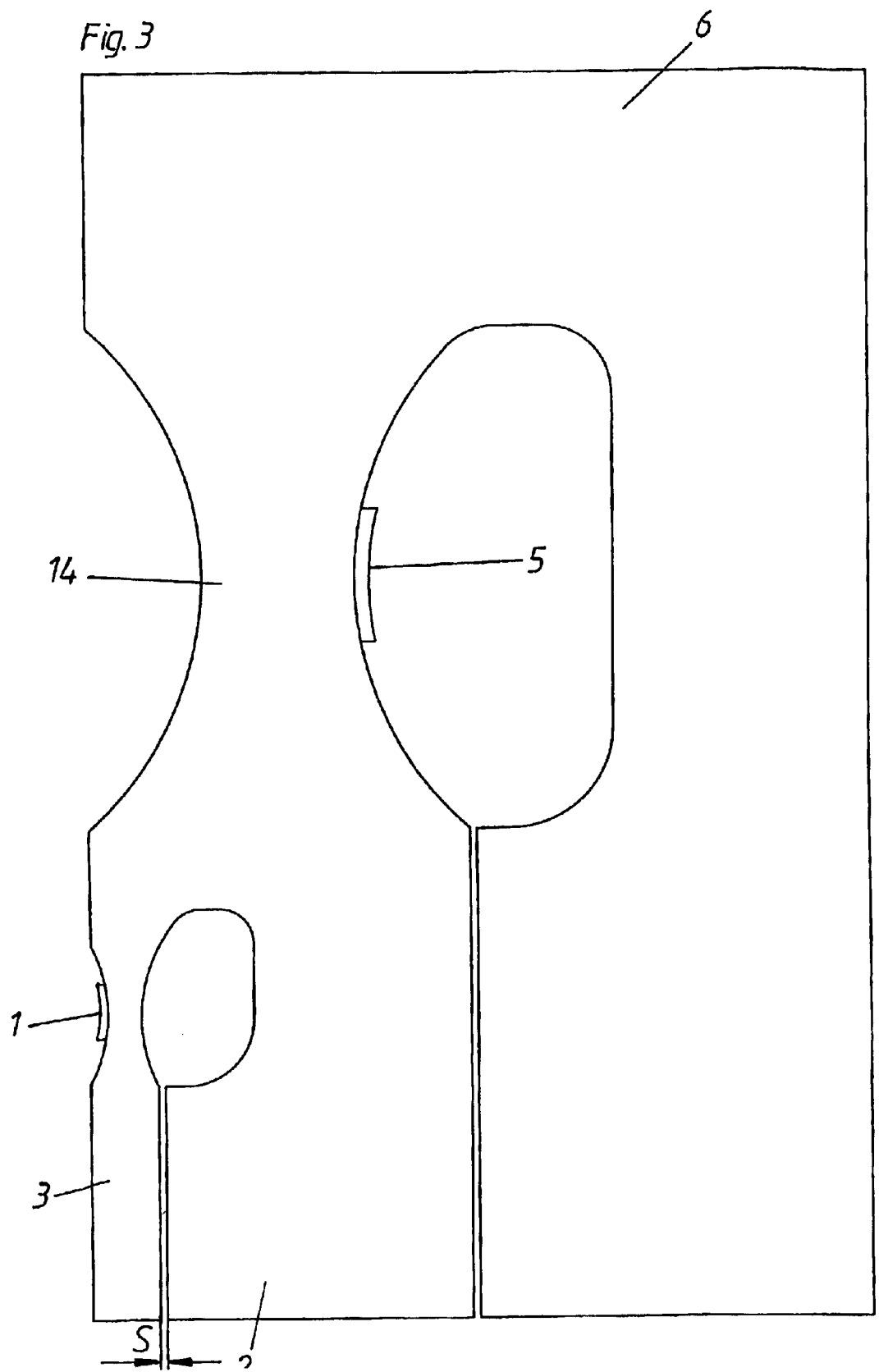

Monitoring of the flexible joint shown in FIG. 3 takes place in an analogous manner. Here too, a supporting body 2 prevents further deformation of the machine part 3 monitored by the sensor 1 as soon as the gap defining the clearance S is closed. Subsequently the sensor 5 only registers the deformation of the segment 14.

Figure 4:
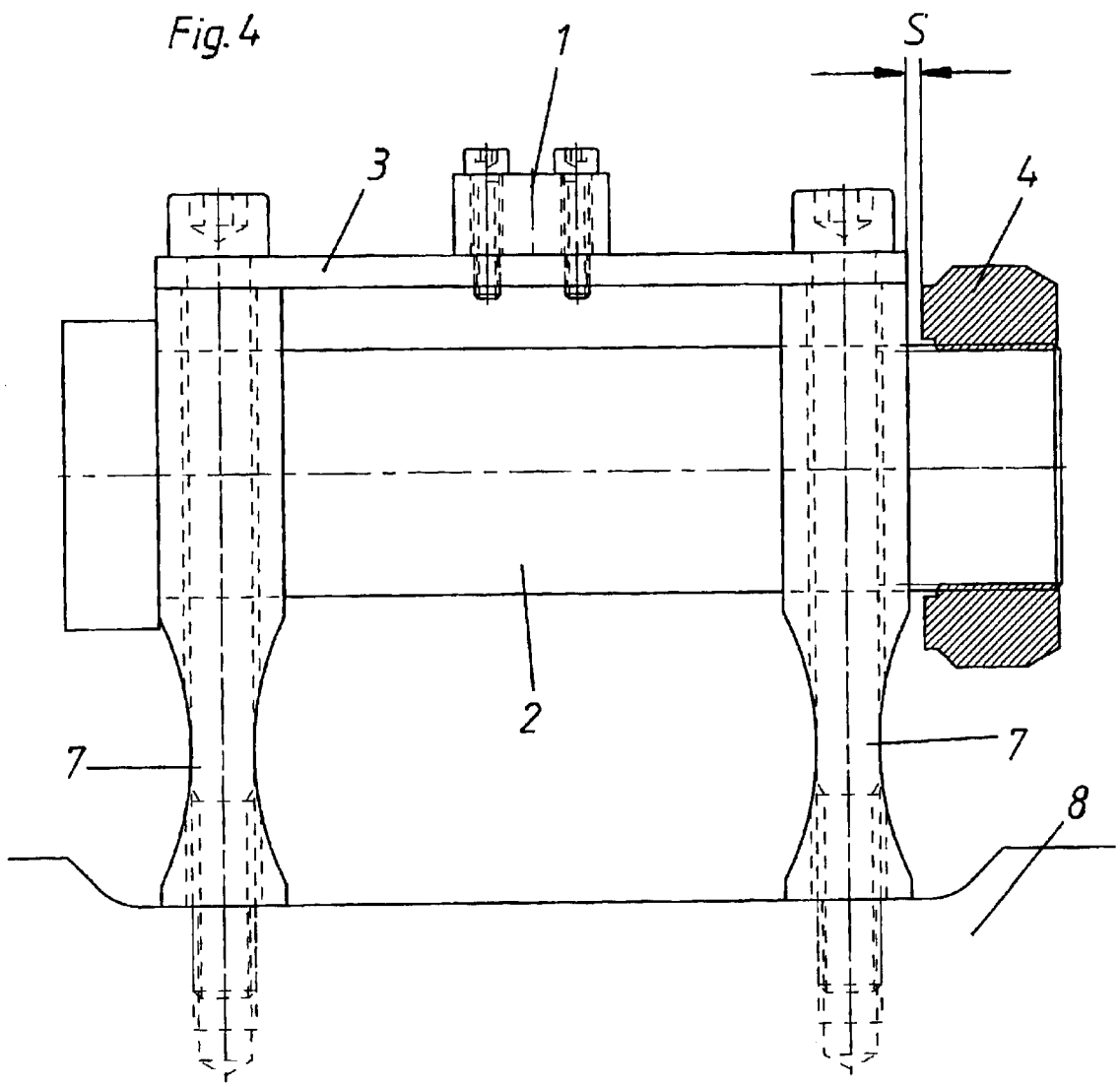

Most injection moulding machines are provided with beams, which are expanded when the closing force is applied. In FIG. 4 such a beam 8 is shown, the expansion of which transfers to the machine part 3 that is monitored by the sensor 1. Again, the sensor 1 is bridged when the clearance S is exhausted and the upright 7 lies against the stop nut 4.

Figure 5:
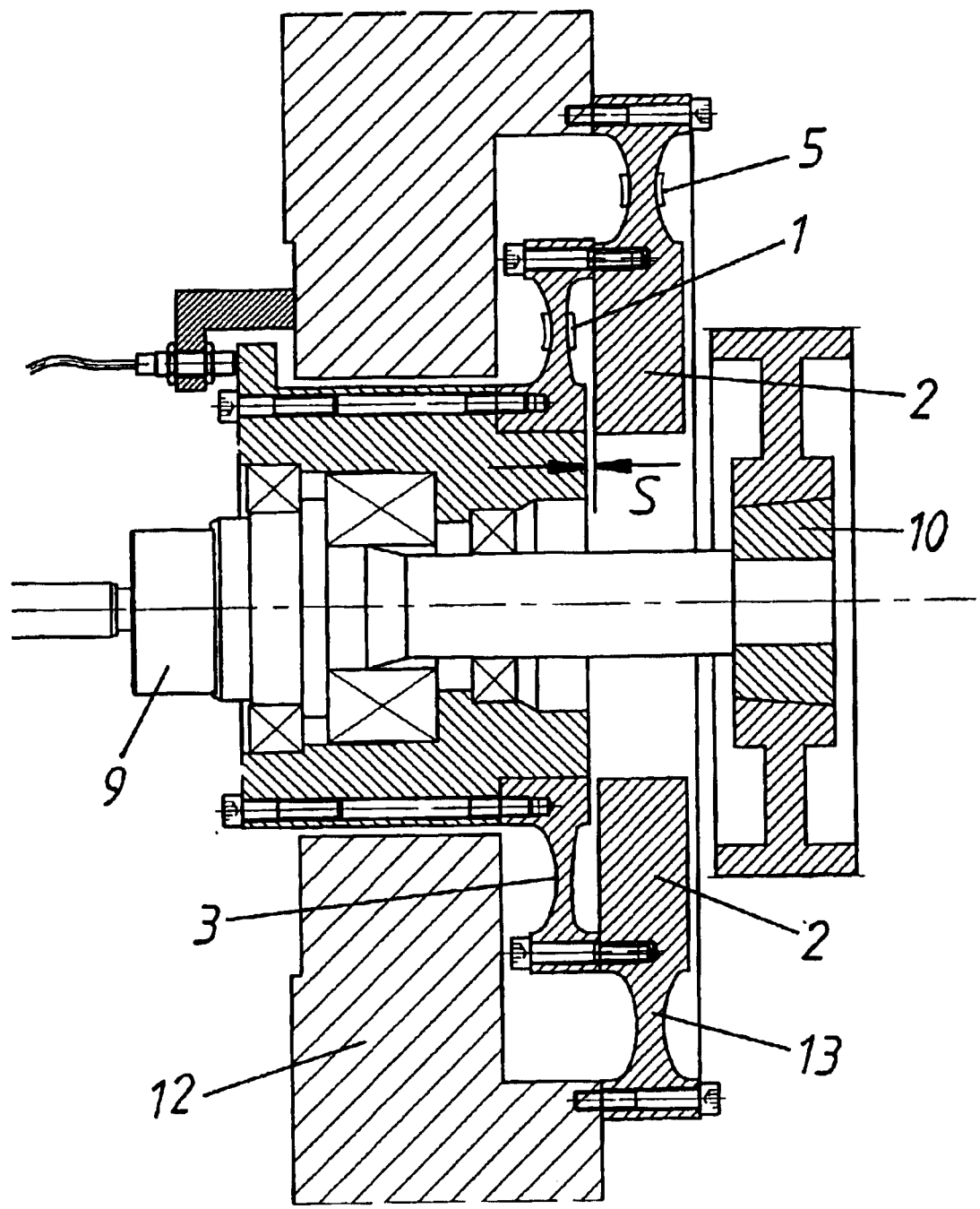

In FIG. 5 the part of the injection device of an injection moulding machine that is of interest with respect to the invention is shown. This is a metering screw 9 that is made to rotate by a motor 10 and can be moved by an axially movable pressure plate 12 in a stationary cylinder that is not shown. When the screw 9 is being rotated by the motor 10, the back pressure described in the introduction occurs which deforms the annular machine part 3 when the pressure plate 12 is stationary. This deformation is monitored by the sensor 1. After termination of the metering procedure, the plate 12 in FIG. 5 moves to the left, whereby the clearance S disappears and the supporting body 2 relieves the sensor. The actual injection pressure, which is considerably higher than the back pressure, is measured by the sensor 5.

What is claimed is:

1. Device for monitoring force and pressure in injection moulding machines, with at least one sensor for measuring the deformation of a machine part that is deformed by the closing or injection pressure, characterised in that a supporting body is provided that relieves the machine part monitored by the sensor as soon as the closing or injection pressure exceed a certain value that is less than half of its maximum value.

2. Device according to claim 1, characterised in that by means of the deformation monitored, a clearance delimited by a stop on the supporting body is overcome.

3. Device according to claim 1, characterised in that by means of the deformation monitored, a clearance delimited by a stop on the supporting body is overcome, said stop being adjustable.

4. Device according to claim 1, characterised in that at least one further sensor is provided that monitors the closing and injection pressure up to its maximum value.

* * * * *